(12) United States Patent
Edwards et al.

(10) Patent No.: US 10,853,794 B2
(45) Date of Patent: Dec. 1, 2020

(54) SYSTEM AND METHOD FOR GENERATION OF VIRTUAL ACCOUNT-LINKED CARD

(71) Applicant: Capital One Services, LLC, McLean, VA (US)

(72) Inventors: Joshua Edwards, Philadelphia, PA (US); Michael Mossoba, Arlington, VA (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 34 days.

(21) Appl. No.: 16/394,141

(22) Filed: Apr. 25, 2019

(65) Prior Publication Data
US 2020/0342443 A1    Oct. 29, 2020

(51) Int. Cl.
*G06Q 40/00* (2012.01)
*G06Q 20/34* (2012.01)
*G06Q 20/40* (2012.01)

(52) U.S. Cl.
CPC ....... *G06Q 20/351* (2013.01); *G06Q 20/3567* (2013.01); *G06Q 20/3572* (2013.01); *G06Q 20/4097* (2013.01)

(58) Field of Classification Search
USPC .......................................................... 705/41
See application file for complete search history.

(56) References Cited

U.S. PATENT DOCUMENTS

| | | |
|---|---|---|
| 6,049,531 A | 4/2000 | Roy |
| 7,222,782 B2 | 5/2007 | Lute, Jr. et al. |
| 7,284,692 B1 | 10/2007 | Douglass |
| 8,175,973 B2 | 5/2012 | Davis et al. |
| 8,210,426 B1 | 7/2012 | Steinbach et al. |
| 9,033,221 B1 | 5/2015 | Ramachandran et al. |
| 2004/0215566 A1 | 10/2004 | Meurer |
| 2005/0085931 A1 | 4/2005 | Willeby |
| 2006/0163343 A1 | 7/2006 | Changryeol |
| 2007/0244830 A1 | 10/2007 | Hilderman |
| 2009/0201372 A1 | 8/2009 | O'Doherty et al. |
| 2010/0145852 A1 | 6/2010 | Morson |
| 2010/0274691 A1* | 10/2010 | Hammad ............ G06Q 20/3221 705/30 |
| 2011/0302084 A1 | 12/2011 | Melik-Aslanian et al. |
| 2012/0047075 A1* | 2/2012 | Balistierri .......... G06Q 20/3829 705/71 |
| 2013/0048713 A1* | 2/2013 | Pan ........................ G07F 19/20 235/379 |
| 2013/0085938 A1* | 4/2013 | Stone ..................... G06Q 40/02 705/41 |
| 2015/0186872 A1* | 7/2015 | Sobol ................... G06Q 20/351 705/41 |

FOREIGN PATENT DOCUMENTS

CN       105761377      12/2017

\* cited by examiner

*Primary Examiner* — Olabode Akintola
(74) *Attorney, Agent, or Firm* — Hunton Andrews Kurth LLP

(57) ABSTRACT

Embodiments of systems and methods for generating virtual account-linked cards are described. A virtual account-linked card may be generated in response to a determination that a physical account-linked card has been forgotten at a card reader and ingested by the card reader. A virtual account-linked card may be restricted such that it can only be used to execute a transaction with authorized transaction partners identified in a database.

16 Claims, 8 Drawing Sheets

Method 500

Method 800

SYSTEM AND METHOD FOR GENERATION OF VIRTUAL ACCOUNT-LINKED CARD

FIELD OF THE INVENTION

This disclosure relates to account-linked cards, and more specifically, to systems and methods for generating virtual account-linked cards when physical account-linked cards are forgotten or lost at a card reader.

BACKGROUND

Account-linked cards have become commonplace, as many individuals use account-linked cards such as those for access to membership club accounts, rewards accounts, gyms, parking facilities, secured buildings, accounts at banking institutions, accounts for mass transportation and other types of accounts. Account-linked cards are frequently used with card readers, some of which require the account holder to insert the account-linked card containing information on a magnetic strip or information on an embedded memory into the card reader. After the card has been read and authenticated, the account holder may be able to carry out various transactions.

When a card reader requires an account holder to insert a physical account-linked card to access her accounts or execute a transaction, the account holder may forget to remove the account-linked card when finishing with the card reader. In that situation, some card readers are configured to ingest or swallow the account-linked card so that once the customer has left the area of the card reader, the account-linked card is no longer accessible to persons other than the account holder.

However, such a system may cause significant inconvenience to an account holder. If a card reader has ingested an account holder's account-linked card, the account holder will no longer be able to use the account-linked card to access their accounts at the card reader or execute transactions using the card. Frequently, the account holder's only option for obtaining a working account-linked card is to call the account servicing institution with which the account-linked card is associated, cancel the account-linked card, and order a replacement card to be sent through the mail. This process can be time consuming and leave the customer without sufficient access to their accounts.

Therefore, there is a need for systems which protect account holders who forget their account-linked cards at a card reader without causing those account holders the inconvenience of being denied access to their accounts for significant periods of time.

SUMMARY

It is an object of this disclosure to describe a system that improves account holder access to an account associated with an account-linked card while maintaining protection of the account holder's account information when the account-linked card is forgotten.

Embodiments of the present disclosure provide a system including a card reader configured to read an account-linked card having account-linking information, a server including a processor, and a storage medium containing a database which stores data for an account associated with the account-linked card. The data includes information for account-linked cards and virtual cards associated with the account. The card reader is configured to determine whether the account-linked card has been forgotten and in response to a determination that the account-linked card has been forgotten, send a signal to the server indicating that the account-linked card has been forgotten. The server is configured, in response to receiving the signal indicating that the account-linked card has been forgotten, to disable the account-linked card and generate a new virtual card having the account-linking information by editing the data in the database.

Embodiments of the present disclosure further provide a method including the steps of reading an account-linked card having account-linking information at a card reader, determining whether the account-linked card has been forgotten and in response to a determination that the account-linked card has been forgotten, ingesting the account-linked card in the card reader, sending a signal to a server via a network indicating that the account-linked card has been forgotten, flagging the account-linked card as unauthorized in a database located on a storage medium, where the database stores data for an account associated with the account-linked card, generating a virtual card in the database having the Embodiments of the present disclosure further provide a server which includes a processor. The server is configured to receive a notification from a card reader identifying a lost account-linked card having account-linking information and which is associated with an account; in response to receipt of the notification, create a flag in a database contained in a storage medium which stores data for the account, wherein the flag identifies the account-linked card as unauthorized; and in response to receipt of the notification, generate a virtual card having the account-linking information in the database, wherein the virtual card is authorized to be used to access the account.

DETAILED DESCRIPTION

One aspect of the present disclosure is to provide a system that automatically generates a virtual account-linked card when a physical account-linked card is forgotten or abandoned at a card reader. Hereinafter, a physical account-linked card will be referred to simply as "an account-linked card."

Figure 1:
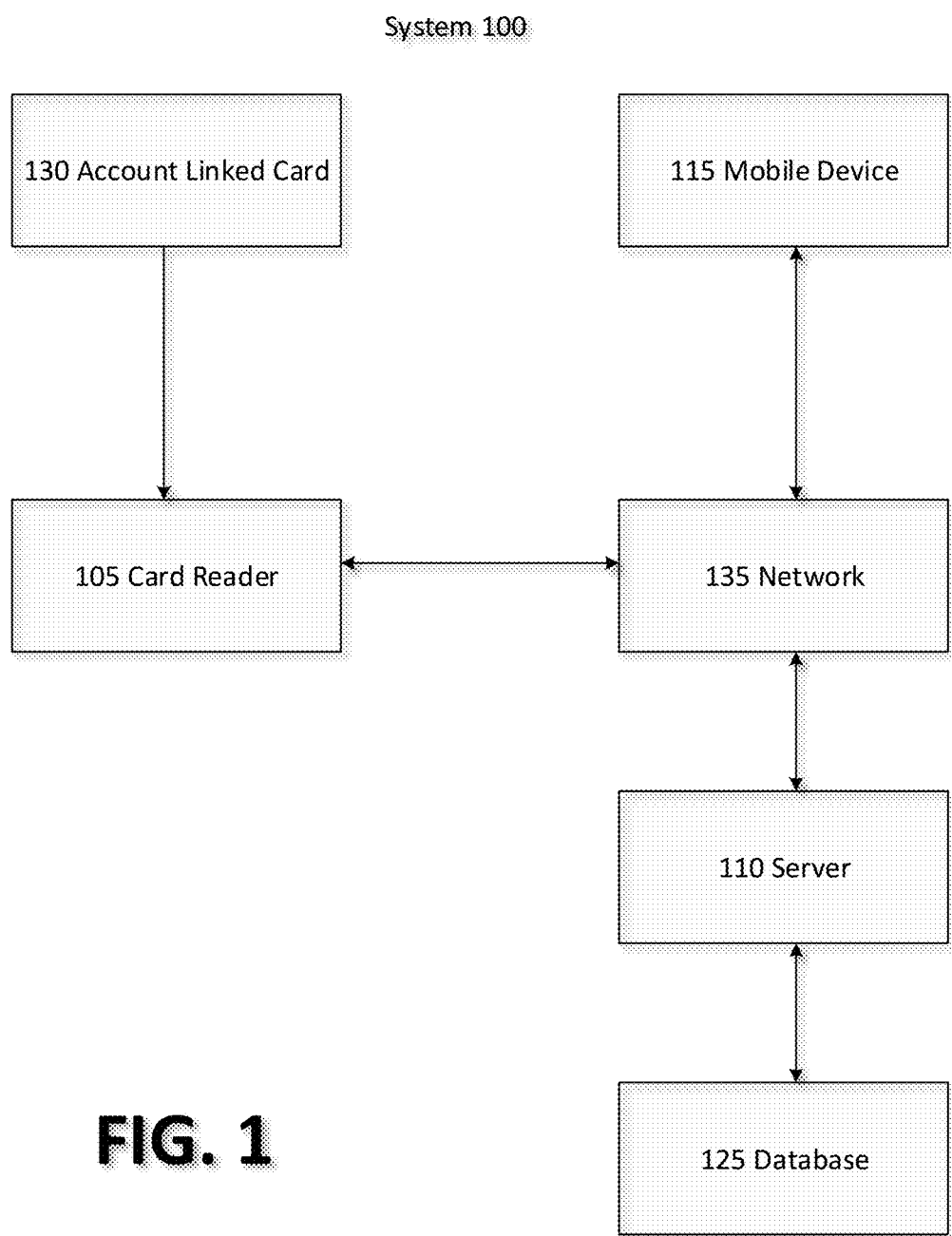
FIG. 1 illustrates an example embodiment of a system for generating a virtual account-linked card.

An example embodiment of a system for generating a virtual account-linked card is shown in FIG. 1. The system 100 includes a card reader 105 which can read and authenticate an account-linked card 130. The card reader 105 is connected to a network 135 which can be the Internet, a wide area network (WAN), or another suitable type of network. The card reader 105, like other elements of system 100, may be connected to the network via a wireless connection or a wired connection.

A server 110 is also connected to the network 135. The server 110 includes a central processing unit (CPU) and a memory for storing instructions executable by the CPU. The server 110 is capable of accessing a database 125 which includes one or more storage media and stores various data associated with one or more accounts. As shown in FIG. 1, the server 110 is connected directly to the database 125, though database 125 could alternatively be incorporated within the server 110, accessed by the server 110 via the network 135, or configured in any other suitable way for access by the server 110. Database 125 may additionally be functionally distributed across two or more hardware units accessible by the server 110.

System 100 may also include a mobile device 115 and a computer 120, which are connected to the network 135. The mobile device 115 or computer 120 may be those of an account holder of an account associated with the account-linked card 130. The mobile device 115 and computer 120 are suitable for receiving notifications sent by the server 110 via the network 135 relating to the account-linked card 130 or the account associated with the account-linked card 130. The mobile device 115 may be a smart phone or any other network connected device suitable for receiving notifications.

The card reader 105 is a device capable of reading and authenticating account-linking information stored on the account-linked card 130. The card reader 105 may include a display for displaying a graphical user interface to an account holder. The card reader 105 may further include a keypad, a keyboard, and/or a touch screen interface by which the account holder can input information. The card reader 105 preferably includes a CPU and a memory which stores instructions for execution by the CPU.

The card reader 105 may include a slot or another receptacle for receiving and reading the account-linking information stored on the account-linked card 130. The account-linked card 130 may be any secure card such as a magnetic strip card which stores account-linking information in a magnetic strip, a smart card having an integrated circuit and memory which stores account-linking information in the memory, or a card implementing radio frequency identification technology.

In ordinary use, an account holder may insert her account-linked card 130 into the card reader 105. The card reader 105 may then prompt the account holder via the graphical user interface on the display to authenticate the account-linked card 130, for example, by entering a personal identification number (PIN), or by other means. If successfully authenticated, the card reader 105 may display the account holder's account information to the account holder via the graphical user interface and may also allow the account holder to make transactions.

When preparing to display account information to the account holder, the card reader 105 sends a request to the server 110, which may be in the form of an application programming interface (API) call, via the network requesting account information. The server 110 retrieves the requested information from the database 125 and sends it back to the card reader 105 via the network for display to the account holder in the graphical user interface. Information stored in the database 125 is described in further detail hereinafter with reference to FIG. 2.

Figure 2:
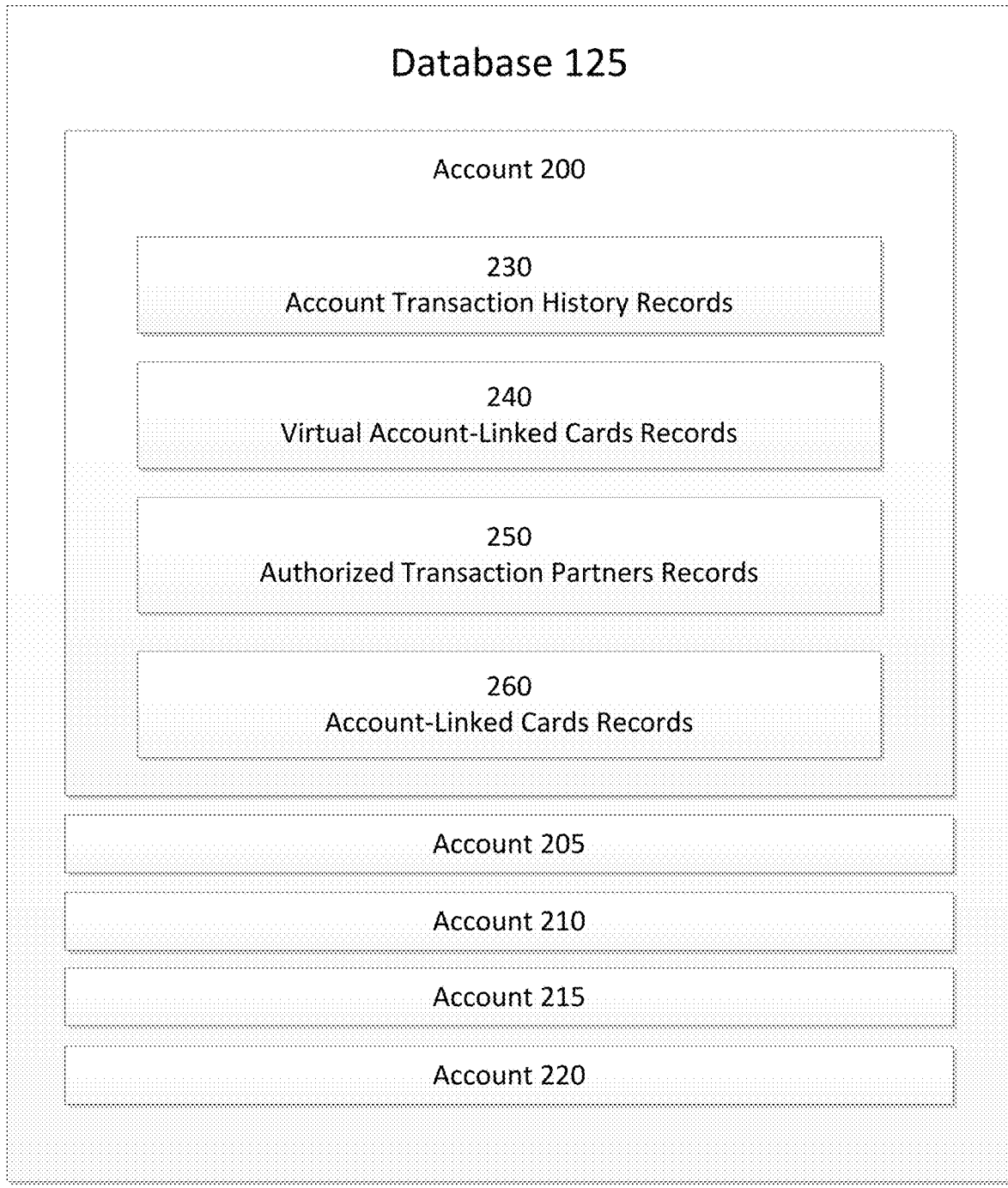
FIG. 2 illustrates an example embodiment of a database used with a system for generating a virtual account-linked card.

FIG. 2 is a conceptual diagram showing information stored in database 125. Database 125 stores information for a plurality of accounts, including accounts 200, 205, 210, 215, and 220. The quantity of accounts shown in database 125 is limited in FIG. 2 for convenience and simplicity, but such a database may be capable of storing information for a very large number of accounts, depending on the size of the institution servicing the accounts. Each individual account, such as account 200, may be associated with one account holder or may be associated with more than one account holder such as in the case of a family having a joint account. Also, a single account holder may be associated with more than one account.

For each account, as shown for account 200 in FIG. 2, certain account-specific information is stored in the database 125. Such account-specific information includes account transaction history which is stored in the account transaction history records 230. Account transaction history may include data for past transactions associated with the account, including an identity of a transaction partner for each transaction, date and time of each transaction, value of each transaction, and transaction type of each transaction. Each of the foregoing types of data stored in the account transaction history records is explained more fully below.

Information identifying a transaction partner for a particular transaction may be stored in the account transaction history records 230 to identify a partner with whom the account holder has conducted a transaction. A transaction partner may be, for example, a merchant from whom the account holder purchased a good or a service, or may alternatively be a payor from whom the account holder received payment. The identity of a transaction partner may be stored in the database by name, by a reference number, or by another suitable means.

The date and time of each transaction may be stored in the account transaction history records 230 to identify the date and time at which each transaction occurred.

The value of each transaction may be stored in the account transaction history records 230 to identify the value of each transaction executed. The value of a transaction may, for example, be indicated by a dollar amount exchanged between the account holder and the transaction partner. In such a case, the transaction value may be represented by any currency amount, including, for example, a cryptocurrency amount.

The transaction type of each transaction may be stored in the account transaction history records 230 to identify the transaction type of each transaction executed. Transaction types include card-present transactions for which the account holder presents the account-linked card so that it can be swiped or otherwise read by a device in proximity which executes the transaction. Transaction types also include card-not-present transactions for which the account holder does not physically present the account-linked card to execute the transaction. A card-not-present transaction may occur, for example, when the account holder purchases an item online using an account-linked card by entering information identifying the account-linked card. A card-not-present transaction may also occur, for example, when automatically paying recurring bills, such as a utility bill or a bill for a subscription to a movie streaming service, with a an account-linked card.

Database 125 also includes virtual account-linked cards records 240. Information for virtual account-linked cards associated with the account 200 are stored in the virtual account-linked cards records 240. An account holder may use the virtual account-linked cards to execute a transaction without physically presenting an account-linked card, i.e. execute a card-not-present transaction. For example, an account holder may request that an account servicing institution issue a virtual account-linked card to carry out a specific card-not-present transaction. An account holder may make such a request when access to an account-linked card is difficult or inconvenient. In practice, an account holder may request a virtual account-linked card and execute a card-not-present transaction by entering identifying information for the virtual account-linked card such as a card number and other information provided for the virtual account-linked card by the account servicing institution. An account holder may execute a card-not-present transaction with a virtual account-linked card in much the same way an account-holder may execute a card-not-present with an account-linked card, though an account-holder may not execute a card-present transaction with a virtual account-linked card. The virtual account-linked cards records 240 may include information for more than one virtual account-linked card associated with the account 200.

Database 125 also includes authorized transaction partners records 250. The authorized transaction partners records 250 includes information identifying authorized transaction partners for virtual account-linked cards associated with the account 200. Each of the virtual account-linked cards for which information is stored in the virtual account-linked cards records 240 may be associated with one or more authorized transaction partners for which identifying information is stored in the authorized transaction partners records 250. This association is discussed in further detail hereinafter with respect to FIG. 3.

Database 125 also includes account-linked cards records 260. The account-linked cards records 260 stores information for account-linked cards associated with the account 200 which the account holder may use to execute either card-present or card-not-present transactions. The account-linked cards records 260 may store more than one account-linked card associated with the account 200.

Database 125 further stores information associated with account 205, account 210, account 215, and account 220. The information associated with those accounts is not shown with the same detail as with account 200 in FIG. 2 for convenience and simplicity, though it is understood that similar information would be stored for each account stored in the database 125. Moreover, information for many more accounts may be stored in database 125 than shown in FIG. 2.

Figure 3:
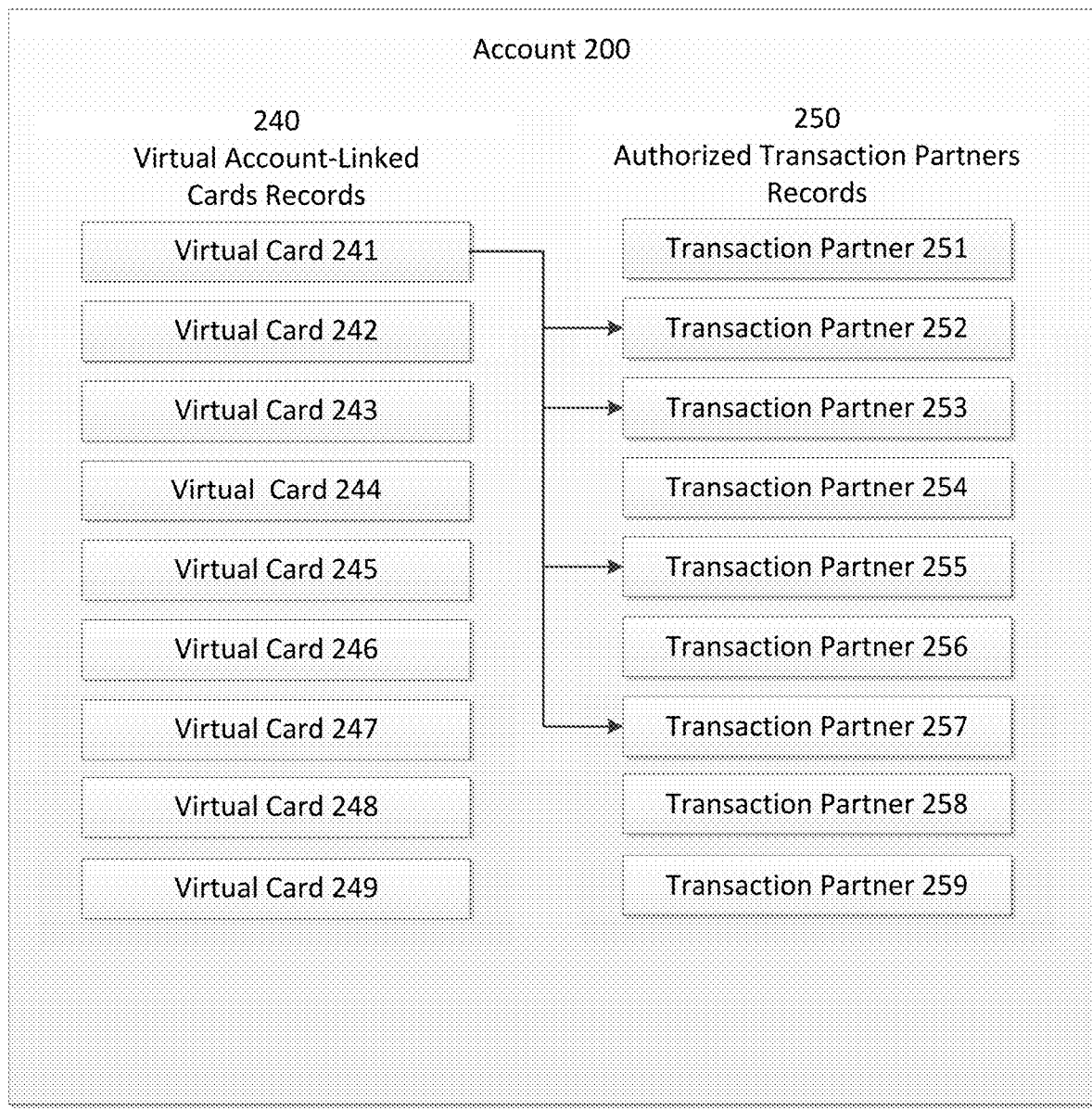
FIG. 3 illustrates an example embodiment of an account within a database used with a system for generating a virtual account-linked card.

FIG. 3 shows in greater detail the relationship between the virtual account-linked cards for which information is stored in the virtual account-linked cards records 240 and the authorized transaction partners for which identifying information is stored in the authorized transaction partners records 250. FIG. 3 shows nine virtual account-linked cards 241 through 249 stored in the virtual account-linked cards records 240, though fewer or more may be stored and associated with the account 200. FIG. 3 also shows nine transaction partners 251-259 stored in the authorized transaction partners records 250, though fewer or more may be stored and associated with the account 200.

By way of example, virtual account-linked card 241 is shown with arrows pointing to transaction partners 252, 253, 255, and 257. In this example, transaction partners 252, 253, 255, and 257 are authorized transaction partners for virtual account-linked card 241. As a consequence, the account holder may use virtual account-linked card 241 to execute a transaction with any of transaction partners 252, 253, 255, and 257, but not with any of the other transaction partners stored in the authorized transaction partners records 250 and not with any transaction partners not stored in the authorized transaction partners records 250. By limiting the authorized transaction partners for the virtual account-linked card 241 in this way, the security of virtual account-linked card 241 can be improved as compared to a situation where its potential transaction partners are unrestricted. Consequently, the account holder is better protected from fraud.

Though not shown in FIG. 3 for the sake of clarity, virtual account-linked cards 242 to 249 may be associated with one or more of the transaction partners 251 to 259 stored in the authorized transaction partners records 250. Each of virtual account-linked cards 241 to 249 may also be associated with transaction partners independently of other virtual account-linked cards.

It should be noted that FIG. 2 and FIG. 3 are conceptual diagrams to facilitate understanding of the information stored therein and that information in the database 125 may be arranged in ways other than shown in FIG. 2 and FIG. 3.

With reference back to FIG. 1, when an account holder has concluded her session at card reader 105, the account holder will typically be reminded to remove the account-linked card 130 from the card reader 105. However, in certain circumstances, the account holder may forget to remove the account-linked card 130 when finished with the card reader 105 and inadvertently leave the vicinity of the card reader 105 without the account-linked card 130.

An embodiment of the present invention is directed to improving the account holder's experience in a situation where the account holder has forgotten or abandoned her account-linked card 130 at the card reader 105 by automatically converting the forgotten account-linked card 130 to a virtual account-linked card which the account holder may use to access account information and execute transactions.

Figure 4:
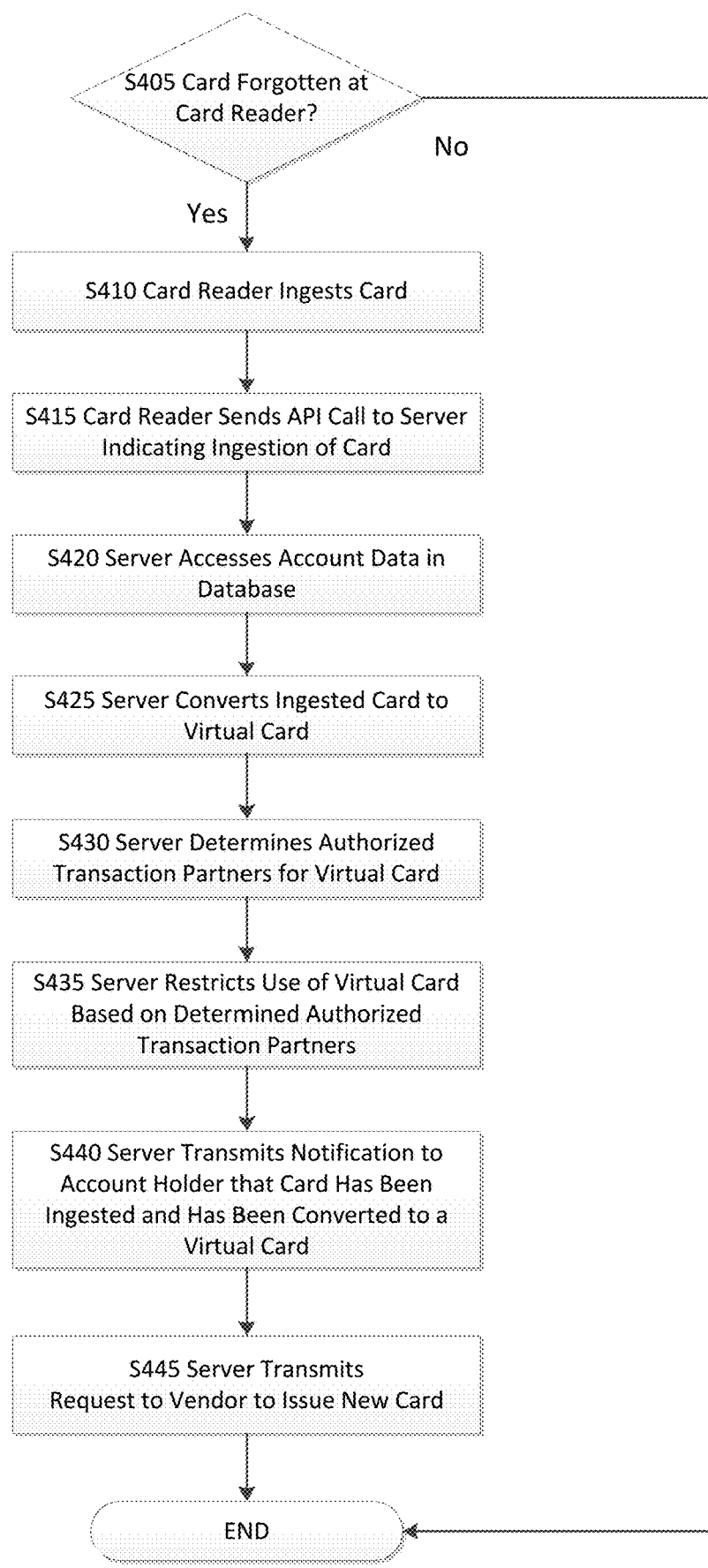
FIG. 4 illustrates an example embodiment of a method for generating a virtual account-linked card.

FIG. 4 shows a method 400 of automatically generating a virtual account-linked card which may be carried out by the aforementioned system 100. At step S405, the card reader makes a determination whether the account-linked card has been abandoned or forgotten at the card reader. To make such a determination, the card reader may include a camera or motion sensor pointed in a direction toward an expected position of an account holder. In response to a signal that the account-linked card is in a slot or other receptacle of the card reader and a signal that the account holder has left the vicinity of the card reader as detected by the camera or motion sensor, the card reader may determine that the account-linked card has been forgotten. Alternatively, the card reader may determine that the account-linked card has been forgotten in response to a signal that the account-linked card is in a slot or other receptacle of the card reader and a predetermined time period has passed during which no account holder activity has been detected at the card reader.

In response to a determination at step S405 that the account-linked card has not been forgotten, the method 400 ends.

In response to a determination at step S405 that the account-linked card has been forgotten, the method 400 proceeds to step S410. At step S410, the card reader ingests the account-linked card such that it is not accessible to a person in the vicinity of the card reader. By doing so, the card reader prevents a person other than the account holder who encounters the forgotten account-linked card from recovering it and engaging in fraudulent transactions.

Proceeding to step S415, the card reader sends a request, which may be an API call, via the network indicating that the account-linked card has been forgotten and ingested by the card reader. Then at step S420, after receiving the API call sent by the card reader via the network, the server accesses the information in the database for the account associated with the forgotten account-linked card. The method then proceeds to step S425.

At step S425, the server converts the forgotten account-linked card in the database from an account-linked card associated with the account to a virtual account-linked card associated with the account. The server may do this by moving the data identifying the forgotten account-linked card from the account-linked cards records of the database to the virtual account-linked cards records of the database. The server may alternatively convert the forgotten account-linked card by flagging the account-linked card in the database or by any other suitable method. Regardless of the mechanism by which the forgotten account-linked card is converted to a new virtual account-linked card, the new virtual account-linked card retains the identifying information of the forgotten account-linked card. For example, the new virtual account-linked card may retain the same sixteen digit account number, expiration date, and confirmation code of the forgotten account-linked card. The method then proceeds to step S430.

At step S430 the server determines authorized transaction partners for the new virtual account-linked card. The server makes this determination based on account transaction history stored in the account transaction history records of the database. A method for making this determination will be explained in greater detail hereinafter with reference to FIG. 5. The method then proceeds to step S435.

At step S435, the server associates the new virtual account-linked card with the authorized transaction partners determined in step S430 and restricts use of the new virtual account-linked card such that it can only be used to execute transactions with those authorized transaction partners. In other words, the server configures the new virtual account-linked card such that future transactions with the authorized transaction partners using the new virtual account-linked card will be allowed and such that future transactions with transaction partners other than the authorized transaction partners using the new virtual account-linked card will be prohibited. The method then proceeds to step S440.

At step S440, the server transmits a notification via the network that the account-linked card has been ingested by the card reader as a result of being forgotten and that the forgotten account-linked card is available for use as a virtual account-linked card. The notification may further indicate that the virtual account-linked card is restricted for use only with the authorized transaction partners. Preferably, the notification is a type which may be received by the account holder's mobile phone or computer via the network.

At step S445, the server transmits a request to a vendor (not shown in FIG. 1) requesting a new account-linked card be issued to the account holder. The server may further specify identifying information for the new account-linked card to the vendor and add the requested new account-linked card to the account-linked cards records of the database. Then the method 400 ends.

Figure 5:
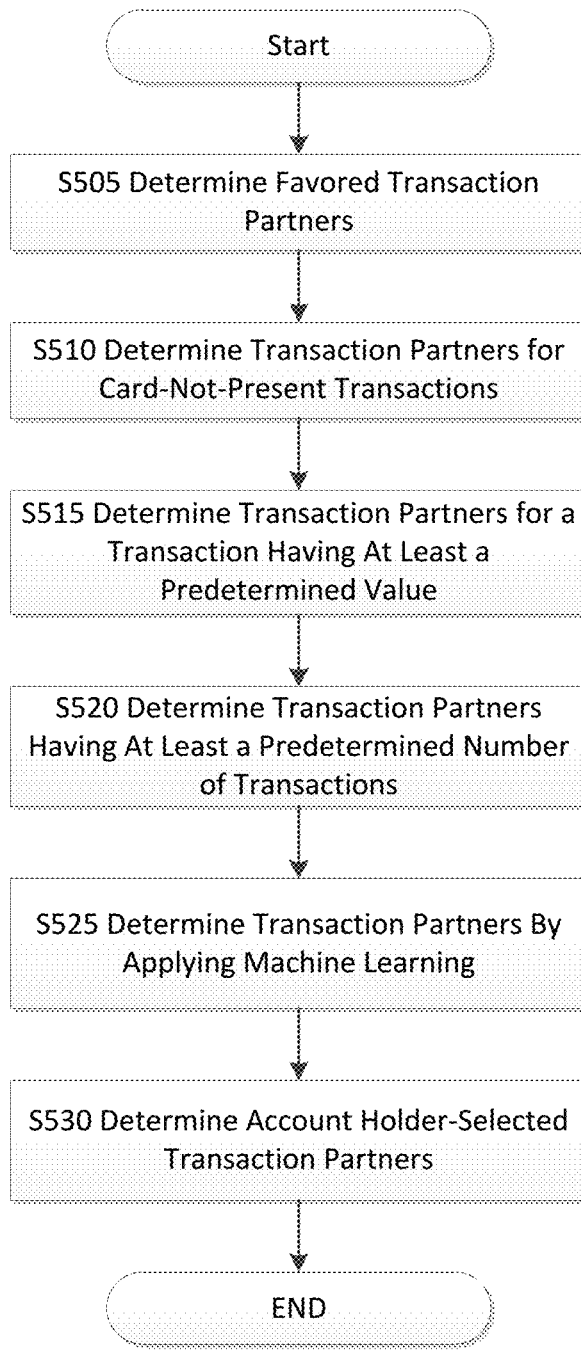
FIG. 5 illustrates an example embodiment of a method for determining authorized transaction partners.

With reference to FIG. 5, the determination of authorized transaction partners made in step S430 of method 400 will be further described as a sub-routine called method 500. In step S505, the server determines favored transaction partners as predetermined by the account servicing institution. When the server has determined favored transaction partners, the server may flag each of those favored transaction partners for association with the new virtual account-linked card. The method then proceeds to step S510.

In step S510, the server determines transaction partners for card-not-present transactions. To do this, the server accesses the account transaction history stored in the account transaction history records of the database. For transactions in the account transaction history, the server determines which were card-not-present transactions, i.e., which transactions occurred without the account holder presenting a account-linked card and swiping it. As additional filtering, the server may limit its determination to transactions which occurred in a predetermined time period, e.g., within the six months, one year, etc. When the server has determined transaction partners for card-not-present transactions in the account transaction history, the server may flag each of those transaction partners for association with the new virtual account-linked card. The method then proceeds to step S515.

In step S515, the server determines transaction partners for transactions having at least a predetermined value. To do this, the server accesses the account transaction history stored in the account transaction history records of the database. For transactions in the account transaction history, the server determines which transactions have at least a predetermined value. The predetermined value may be, for example, a dollar value. For any transactions in the account transaction history having at least the predetermined value, the server determines transaction partners associated with those transactions. As an alternative to filtering transactions having at least the predetermined value, the server may determine which transactions have a value with a predetermined value range as a means for filtering the transactions. When the server has determined transaction partners for transactions in the account transaction history having at least a predetermined value, the server may flag each of those transaction partners for association with the new virtual account-linked card. The method then proceeds to step S520.

In step S520, the server determines transaction partners having at least a predetermined number of transactions. To do this, the server accesses the account transaction history stored in the account transaction history records of the database. The server determines transaction partners with whom the account holder has engaged in at least a predetermined number of transactions. When the server has determined transaction partners with whom the account holder has executed at least a predetermined number of transactions, the server may flag each of those transaction partners for association with the new virtual account-linked card. The method then proceeds to step S525.

In step S525, the server determines transaction partners by applying a machine learning algorithm. To do this, the server accesses the account transaction history stored in the account transaction history records of the database. As an example application of a machine learning algorithm, the server may analyze the account transaction history using the machine learning algorithm to determine transaction partners with whom the account holder executes recurring transactions. Based on the dates and times of transactions with certain transaction partners, a frequency of transactions with certain transaction partners, a similarity in values of transactions with certain transaction partners, or a combination of the foregoing, the server may determine that the account holder executes recurring transactions with certain transaction partners. When the server has determined transaction partners identified by the machine learning algorithm, the server may flag each of those transaction partners for association with the new virtual account-linked card. The method then proceeds to step S530.

In step S530, the server determines account holder-selected transaction partners. Account holder-selected transaction partners may be transaction partners that have been selected by the account holder for authorization. The account holder may make such a selection when first opening the account or alternatively, may make such a selection upon notification by the account-servicing institution at the time of ingestion of an account-linked card at a card reader. Such a selection may be made via the account holder's mobile phone, computer, other suitable device, or at a physical location maintained by the account servicing institution. Account-holder selected transaction partners may be flagged in the authorized transaction partners records of the database. When the server has determined account holder-selected transaction partners, the server may further flag each of those transaction partners for association with the new virtual account-linked card. The method then ends.

It should be noted that method 500 as described above and shown in FIG. 5 includes several steps for determining and flagging transaction partners for association with the new virtual account-linked card, but it is not necessary for practice of the invention to perform every step in the order shown in FIG. 5. Embodiments of the present invention may determine and flag transaction partners by performing only one, or a subset, of the steps shown in FIG. 5 and may vary the order in which multiple steps are performed or perform them in parallel.

The advantages of practicing the method 400 in conjunction with the subroutine method 500, both described above, are improved security and convenience for the account holder. By automatically making an account-linked card forgotten at a card reader available for use as a virtual account-linked card, the account holder maintains access to her account and may continue to execute certain transactions she previously executed using the forgotten account-linked card with the new virtual account-linked card. This eliminates a period without account access before either the account servicing institution can issue a new account-linked card and/or the account holder can retrieve the new account-linked card. During that period, the account holder can execute transactions using the new virtual account-linked card with authorized transaction partners. In the case of executing transactions with transaction partners with whom the account holder executes recurring transactions, the disclosed system and method provide a means to allow those transactions to continue uninterrupted.

Moreover, by determining authorized transaction partners and restricting use of the new virtual account-linked card to execution of transactions with authorized transaction partners, security of the new virtual account-linked card can be improved. By restricting use of the new virtual account-linked card in this way, individuals other than the account holder that may have information about the forgotten account-linked card otherwise sufficient to engage in a card-not-present transaction will be prohibited from engaging in such transactions with transaction partners other than the authorized transaction partners. As a result, the account holder is less susceptible to fraud.

Additionally, the method 400 described above is advantageous because it automatically transmits a request that a new account-linked card be issued to the account holder upon ingestion by the card reader. This eliminates the inconvenience inherent in requiring the account holder to actively request a new account-linked card when she has forgotten her account-linked card at a card reader.

Figure 6:
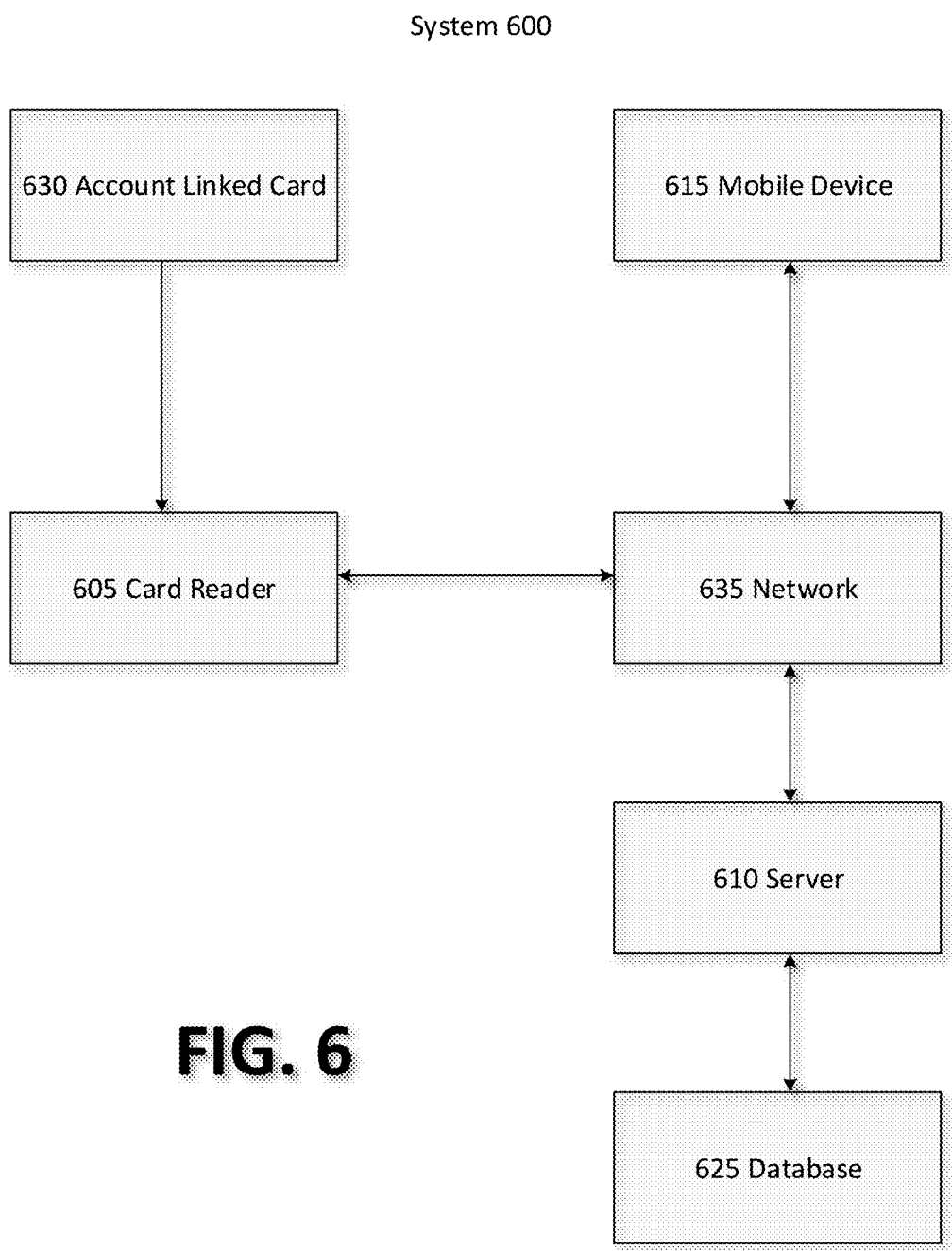
FIG. 6 illustrates an example embodiment of a system for generating a virtual account-linked card using an automated teller machine where the virtual account-linked card is a payment card.

Another embodiment of the present invention is shown in FIG. 6. The system 600 shown in FIG. 6 includes an automated teller machine (ATM) 605 and a payment card 630 which may be a debit card or a credit card issued by an account servicing institution such as a financial institution or a bank. The mobile device 615, computer 620, network 635, server 610, and database 625 are analogous to the mobile device 115, computer 120, network 135, server 110, and database 125 shown in FIG. 1 and described above.

In ordinary use, an account holder may insert her payment card 630 into the ATM 605. The ATM 605 may then prompt the account holder via a graphical user interface on the display to authenticate the payment card 630, for example, by entering a personal identification number (PIN). If successfully authenticated, the ATM 605 may display the account holder's account information, such as available funds, to the account holder via the graphical user interface and may also allow the account holder to make transactions such as withdrawal of cash, deposits, or others.

When an account holder has concluded her session at ATM 605, the account holder will typically be reminded to remove the payment card 630 from the ATM 605. However, in certain circumstances, the account holder may forget to remove the payment card 630 when finished with the ATM 605 and inadvertently leave the vicinity of the ATM 605 without the payment card 630.

An embodiment of the present invention is directed to improving the account holder's experience in a situation where the account holder has forgotten or abandoned her payment card 630 at the ATM 605 by automatically converting the forgotten payment card 630 to a virtual payment card which the account holder may use to access account information and execute transactions.

Figure 7:
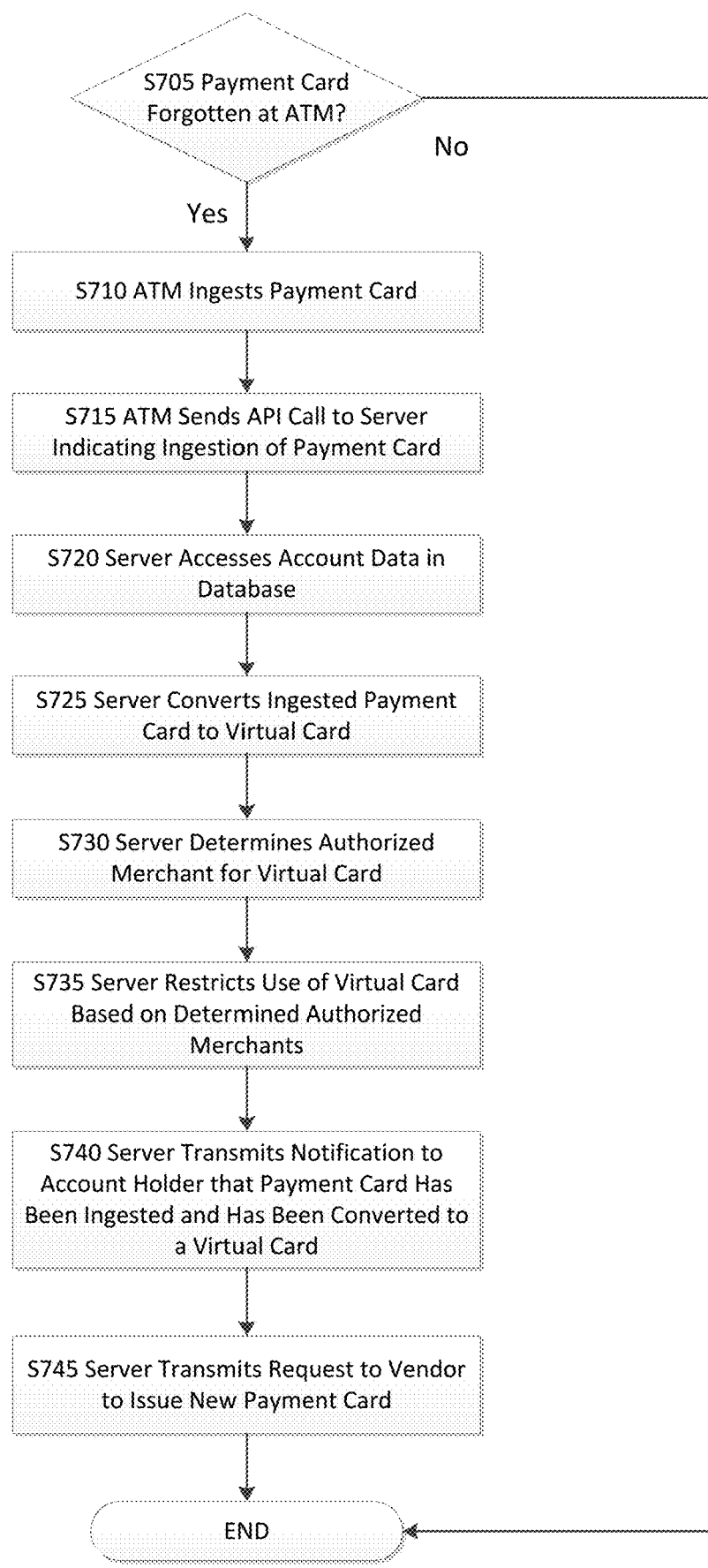
FIG. 7 illustrates an example embodiment of a method for generating a virtual account-linked card using an automated teller machine where the virtual account-linked card is a payment card.

FIG. 7 shows a method 700 of automatically generating a virtual payment card when a payment card is forgotten at an ATM, which may be carried out by the aforementioned system 600. At step S705, the ATM makes a determination whether the payment card has been abandoned or forgotten at the ATM. To make such a determination, the ATM may include a camera or motion sensor pointed in a direction toward an expected position of an account holder. In response to a signal that the payment card is in a slot or other receptacle of the ATM and a signal that the account holder has left the vicinity of the ATM as detected by the camera or motion sensor, the ATM may determine that the payment card has been forgotten. Alternatively, the ATM may determine that the payment card has been forgotten in response to a signal that the payment card is in a slot or other receptacle of the ATM and a predetermined time period has passed during which no account holder activity has been detected at the ATM.

In response to a determination at step S705 that the payment card has not been forgotten, the method 700 ends.

In response to a determination at step S705 that the payment card has been forgotten, the method 700 proceeds to step S710. At step S710, the ATM ingests the payment card such that it is not accessible to a person in the vicinity of the ATM. By doing so, the ATM prevents a person other than the account holder who encounters the forgotten payment card from recovering it and engaging in fraudulent transactions or withdrawing cash from the ATM using the payment card.

Proceeding to step S715, the ATM sends a request, which may be an API call, to the server via the network indicating that the payment card has been forgotten and ingested by the ATM. Then at step S720, after receiving the API call sent by the ATM via the network, the server accesses the information in the database for the account associated with the forgotten payment card. The method then proceeds to step S725.

At step S725, the server converts the forgotten payment card in the database from a payment card associated with the account to a virtual payment card associated with the account. The server may do this by moving the data identifying the forgotten payment card from the payment cards records of the database to the virtual payment cards records of the database. The server may alternatively convert the forgotten payment card by flagging the payment card in the database or by any other suitable method. Regardless of the mechanism by which the forgotten payment card is converted to a new virtual payment card, the new virtual payment card retains the identifying information of the forgotten payment card. For example, the new virtual payment card may retain the same sixteen digit account number, expiration date, and confirmation code of the forgotten payment card. The method then proceeds to step S730.

At step S730 the server determines authorized merchants for the new virtual payment card. The server makes this determination based on account transaction history stored in the account transaction history records of the database. A method for making this determination will be explained in greater detail hereinafter with reference to FIG. 8. The method then proceeds to step S735. It is noted that database 625 as shown in FIG. 6 stores information related to "merchants" in an analogous manner as database 125 shown in FIG. 1 stores information related to "transaction partners" as described herein above. It is further noted that database 625 stores information related to "payment cards" and "virtual payment cards" in an analogous manner as database 125 stores information related to "account-linked cards" and "virtual account-linked cards," respectively, as described herein above.

At step S735, the server associates the new virtual payment card with the authorized merchants determined in step S730 and restricts use of the new virtual payment card such that it can only be used to execute transactions with those authorized merchants. In other words, the server configures the new virtual payment card such that future transactions with the authorized merchants using the new virtual payment card will be allowed and such that future transactions with merchants other than the authorized merchants using the new virtual payment card will be prohibited. The method then proceeds to step S740.

At step S740, the server transmits a notification via the network that the payment card has been ingested by the ATM as a result of being forgotten and that the forgotten payment card is available for use as a virtual payment card. The notification may further indicate that the virtual payment card is restricted for use only with the authorized merchants. Preferably, the notification is a type which may be received by the account holder's mobile phone or computer via the network.

At step S745, the server transmits a request to a vendor (not shown in FIG. 1) requesting a new payment card be issued to the account holder. The server may further specify identifying information for the new payment card to the vendor, such as a sixteen digit card number, expiration date, and security code, and add the requested new payment card to payment cards records stored in the database. Then the method 700 ends.

Figure 8:
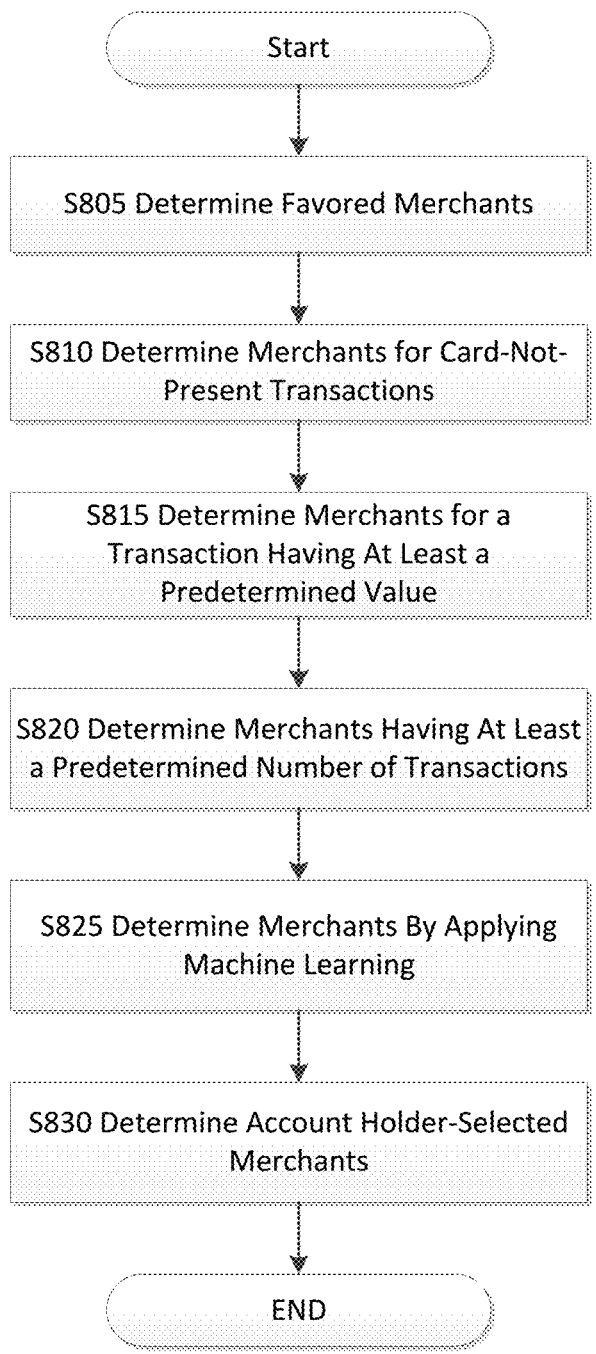
FIG. 8 illustrates an example embodiment of a method for determining authorized transaction partners for transactions executed with a virtual payment card.

With reference to FIG. 8, the determination of authorized merchants made in step S730 of method 700 will be further described as a sub-routine called method 800. In step S805, the server determines favored merchants, which may be predetermined by the account servicing institution. When the server has determined favored merchants, the server may flag each of those favored merchants for association with the new virtual payment card. The method then proceeds to step S810.

In step S810, the server determines merchants for card-not-present transactions. To do this, the server accesses the account transaction history stored in the account transaction history records of the database. For transactions in the account transaction history, the server determines which were card-not-present transactions, i.e., which transactions occurred without the account holder physically presenting a payment card and swiping it. As additional filtering, the server may limit its determination to transactions which occurred in a predetermined time period, e.g., within the six months, one year, etc. When the server has determined merchants for card-not-present transactions in the account transaction history, the server may flag each of those merchants for association with the new virtual payment card. The method then proceeds to step S815.

In step S815, the server determines merchants for transactions having at least a predetermined value. To do this, the server accesses the account transaction history stored in the account transaction history records of the database. For transactions in the account transaction history, the server determines which transactions involved payment of at least a predetermined value. The predetermined value is preferably a dollar value. For any transactions in the account transaction history involving payment of at least the predetermined value, the server determines merchants associated with those transactions. As an alternative to filtering transactions involving payment of at least the predetermined value, the server may determine which transactions involved payment of an amount within a predetermined value range as a means for filtering the transactions. When the server has determined merchants for transactions in the account transaction history meeting either of the foregoing criteria, the server may flag each of those merchants for association with the new virtual payment card. The method then proceeds to step S820.

In step S820, the server determines merchants having at least a predetermined number of transactions. To do this, the server accesses the account transaction history stored in the account transaction history records of the database. The server determines merchants with whom the account holder has engaged in at least a predetermined number of transactions. When the server has determined merchants with whom the account holder has executed at least a predetermined number of transactions, the server may flag each of those merchants for association with the new virtual payment card. The method then proceeds to step S825.

In step S825, the server determines merchants by applying a machine learning algorithm. To do this, the server accesses the account transaction history stored in the account transaction history records of the database. As an example application of a machine learning algorithm, the server may analyze the account transaction history using the machine learning algorithm to determine merchants with whom the account holder executes recurring transactions such as periodic payments. Based on the dates and times of transactions with certain merchants, a frequency of transactions with certain merchants, a similarity in values of transactions with certain merchants, or a combination of the foregoing, the server may determine that the account holder executes recurring transactions with certain merchants. Merchants with whom the account holder executes recurring transactions may include, for example, utilities companies or companies offering subscription services where monthly payment amounts and payment dates vary to some degree but fall within a range predictable by the server's machine learning algorithm. When the server has determined merchants identified by the machine learning algorithm, the server may flag each of those merchants for association with the new virtual payment card. The method then proceeds to step S830.

In step S830, the server determines account holder-selected merchants. Account holder-selected merchants may be merchants that have been selected by the account holder for authorization. The account holder may make such a selection when first opening the account or alternatively, may make such a selection upon notification by the account-servicing institution at the time of ingestion of a payment card at a ATM. Such a selection may be made via the account holder's mobile phone, computer, other suitable device, or at a physical location maintained by the account servicing institution. It is preferable that such a selection be permitted only one, or a similarly limited number of times, to avoid fraudulent activity on the account. Account-holder selected merchants may be flagged in the authorized merchants records of the database. When the server has determined account holder-selected merchants, the server may further flag each of those merchants for association with the new virtual payment card. The method then ends.

It should be noted that method 800 as described above and shown in FIG. 8 includes several steps for determining and flagging merchants for association with the new virtual payment card, but it is not necessary for practice of the invention to perform every step in the order shown in FIG. 8. Embodiments of the present invention may determine and flag merchants by performing only one, or a subset, of the steps shown in FIG. 8 and may vary the order in which multiple steps are performed or perform them in parallel.

The advantages of practicing the method 700 in conjunction with the subroutine method 800, both described above, are improved security and convenience for the account holder. By automatically making a payment card forgotten at a ATM available for use as a virtual payment card, the account holder maintains access to her account and funds and may continue to execute certain transactions she previously executed using the forgotten payment card with the new virtual payment card. This eliminates a period without account access before either the account servicing institution can issue a new payment card and/or the account holder can retrieve the new payment card. During that period, the account holder can execute transactions using the new virtual payment card with authorized merchants. In the case of executing transactions with merchants with whom the account holder executes recurring transactions, such as merchants accepting periodic payments, the disclosed system and method provide a means to allow those payments to continue uninterrupted.

Moreover, by determining authorized merchants and restricting use of the new virtual payment card to execution of transactions with authorized merchants, security of the new virtual payment card can be improved. By restricting use of the new virtual payment card in this way, individuals other than the account holder that may have information about the forgotten payment card otherwise sufficient to engage in a card-not-present transaction will be prohibited from engaging in such transactions with merchants other than the authorized merchants. As a result, the account holder is better protected from fraud.

Additionally, the method 700 described above is advantageous because it automatically transmits a request that a new payment card be issued to the account holder upon ingestion by the ATM. This eliminates the inconvenience inherent in requiring the account holder to actively request a new payment card when she has forgotten her payment card at a ATM.

The present disclosure is not to be limited in terms of the particular embodiments described in this application, which are intended as illustrations of various aspects. Many modifications and variations can be made without departing from its spirit and scope, as may be apparent. Functionally equivalent methods and systems within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system comprising:
   a card reader configured to read an account-linked card having account-linking information;
   a server including a processor; and
   a storage medium containing a database which stores data for an account associated with the account-linked card, the data including information for account-linked cards and virtual cards associated with the account;
   wherein the card reader is configured to determine whether the account-linked card has been forgotten and in response to a determination that the account-linked card has been forgotten, send a signal to the server indicating that the account-linked card has been forgotten; and the server is configured, in response to receiving the signal indicating that the account-linked card has been forgotten, to:

disable the account-linked card, generate a new virtual card having the account-linking information by editing the data in the database, generate, in the database, partner identifying information which identifies a set of authorized transaction partners, wherein each authorized transaction partner has engaged in a transaction with the account within a predetermined time period, and limit the use of the virtual card to transactions involving an authorized transaction partner.

2. The system of claim 1, wherein the partner identifying information is generated based on a transaction history associated with the account.

3. The system of claim 1, wherein the set of authorized transaction partners comprises transaction partners which have engaged in two or more transactions with the account.

4. The system of claim 1, wherein the set of authorized transaction partners comprises transaction partners which have engaged in a transaction with the account having a value greater than a predetermined dollar value.

5. The system of claim 1, wherein the partner identifying information is generated based on a frequency and a value of transactions executed with one or more transaction partners.

6. The system of claim 1, wherein the server is further configured, in response to receiving the signal indicating that the account-linked card has been forgotten, to send an alert to one of a mobile phone and a computer.

7. The system of claim 1, wherein the server is further configured, in response to a receiving the signal indicating that the account-linked card has been forgotten, to send a request for creation of a second account-linked card via the network.

8. The system of claim 1, wherein upon disabling of the account-linked card, the account-linked card cannot be used to execute a transaction.

9. A method comprising:

reading an account-linked card having account-linking information at a card reader;

determining whether the account-linked card has been forgotten and in response to a determination that the account-linked card has been forgotten, ingesting the account-linked card in the card reader;

sending a signal to a server via a network indicating that the account-linked card has been forgotten;

flagging the account-linked card as unauthorized in a database located on a storage medium, where the database stores data for an account associated with the account-linked card;

generating a virtual card in the database having the account-linking information;

generating partner identifying information which identifies a set of authorized transaction partners, wherein each authorized transaction partner has engaged in a transaction with the account within a predetermined time period;

storing the partner identifying information in the database; and limiting the use of the virtual card to transactions involving an authorized transaction partner.

10. The method of claim 9, wherein the partner identifying information is generated based on data associated with the account and stored in the database.

11. The method of claim 9, wherein the set of authorized transaction partners comprises at least one authorized transaction partner for which there exists two or more transactions in a transaction history for the account, wherein values of the two or more transactions are within a predetermined value range.

12. The method of claim 9, wherein the set of authorized transaction partners comprises at least one authorized transaction partner for which a card-not-present transaction exists in a transaction history for the account, wherein the card-not-present transaction occurred within a predetermined time period.

13. The method of claim 9, wherein the partner identifying information is generated based on a frequency of transactions executed with one or more transaction partners, wherein values of the transactions executed with the one or more transaction partners are within a predetermined value range.

14. A server comprising:

a processor;

wherein the server is configured to:

receive a notification from a card reader identifying a lost account-linked card having account-linking information and which is associated with an account;

in response to receipt of the notification, create a flag in a database contained in a storage medium which stores data for the account, wherein the flag identifies the account-linked card as unauthorized;

in response to receipt of the notification, generate a virtual card having the account-linking information in the database, wherein the virtual card is authorized to be used to access the account;

in response to receipt of the notification, generate partner identifying information which identifies a set of authorized transaction partners, wherein each authorized transaction partner has engaged in a transaction with the account within a predetermined time period; and limit the use of the virtual card to transactions involving an authorized transaction partner.

15. The server of claim 14, wherein the server is further configured to generate the set of authorized transaction partners based on a frequency of transactions with the account and a type of transaction with the account, wherein the type of transaction includes a card-present transaction and a card-not-present transaction.

16. The server of claim 14, wherein the server is further configured, in response to receipt of the notification, to send an alert to one of a mobile phone and a computer, the notification containing information about the virtual card.

* * * * *